United States Patent [19]

Okamoto et al.

[11] Patent Number: 5,034,137
[45] Date of Patent: Jul. 23, 1991

[54] METHOD FOR TREATING MUDDY WATER

[75] Inventors: Sohei Okamoto, Musashino; Jiro Hirano, Hasuda; Takusaburo Ohnishi, Tama, all of Japan

[73] Assignee: Kabushiki Kaisha Iseki Kaihatsu Koki, Tokyo, Japan

[21] Appl. No.: 495,269

[22] Filed: Mar. 16, 1990

[30] Foreign Application Priority Data

Mar. 23, 1989 [JP] Japan .................................... 1-69180

[51] Int. Cl.$^5$ .............................................. C02F 1/56
[52] U.S. Cl. ..................... 210/725; 210/727; 210/730; 210/732; 210/733; 210/734
[58] Field of Search ............... 210/725, 727, 728, 732, 210/733, 734, 730

[56] References Cited

U.S. PATENT DOCUMENTS

| | | | |
|---|---|---|---|
| 3,418,237 | 12/1968 | Booth et al. | 210/734 |
| 3,493,499 | 2/1970 | Zeitoun et al. | 210/727 |
| 3,578,586 | 5/1971 | Gal et al. | 210/725 |
| 3,637,491 | 1/1972 | Hedrick et al. | 210/734 |
| 4,173,532 | 11/1979 | Keoteklian | 210/727 |

FOREIGN PATENT DOCUMENTS

| | | | |
|---|---|---|---|
| 53-99656 | 8/1978 | Japan | 210/712 |
| 55-84505 | 6/1980 | Japan | 210/725 |
| 56-70893 | 6/1981 | Japan | 210/727 |

*Primary Examiner*—Peter Hruskoci
*Attorney, Agent, or Firm*—Ware, Fressola, Van Der Sluys & Adolphson

[57] ABSTRACT

A method for treating muddy water which comprises adding a first chemical containing an alkali metal or alkaline earth metal oxide or hydroxide to muddy water to be treated, thereby rendering muddy water alkaline, adding a second chemical containing an anionic polymer coagulant to muddy water simultaneously with or after the addition of the chemical, further adding a third chemical containing a sulfate thereby rendering the muddy water weakly alkaline, and then adding a fourth chemical containing an anionic polymer coagulant to muddy water. As a result, large-sized and hard flocs are produced.

5 Claims, No Drawings

METHOD FOR TREATING MUDDY WATER

BACKGROUND OF THE INVENTION

1. Field of the Invention

This invention relates to a muddy water treating method wherein coagulating agents are added to muddy water to be treated to coagulate fine particles in muddy water into large-sized solid flocs and more particularly, to a treating method suitably used for the process of muddy water produced by the execution of a tunnelling operation, a boring operation, a pile driving operation, an operation of removing sedimentary earth in a storage lake and sewage treatment or the like.

2. Description of the Prior Art

A known method of removing fine particles from muddy water comprises adding one or more coagulating agents in muddy water in a treating vessel to combine fine particles in the muddy water into flocs and sedimentating the flocs by gravity. In this known method, muddy water is separated into a floc phase and an aqueous phase since the flocs are settled. The thus separated flocs are removed from the treating vessel and dewatered, i.e., dehydrated, and then wasted in position. In contrast, the separated water is finally returned to rivers.

In the known method, the coagulating agents are merely added, so that large-sized or hard flocs cannot be produced. In most case, fine particles are partially left in the liquid with the great possibility that the separated water is not transparent.

If the formed flocs are small in size, they are liable to run away along with the liquid at the time of dewatering or transport of the flocs, thus leading to a troublesome after-treatment of the flocs. Alternatively, if the flocs are soft with their mechanical strength being small, the flocs are apt to break. Especially, at the time of dewatering and transport, the flocs will be broken into fine particles, so that the broken flocs are run away along with water. The opaqueness of the separated liquid means that fine particles are left in the liquid with incomplete removal of the fine particles.

Accordingly, the coagulating agents have been conventionally added in large amounts, but the use of the large amounts of expensive chemicals will require much treating costs. Even if coagulating agents are used in large amounts under conditions where the concentration of fine particles in muddy water is high, either large-sized or hard flocs are not produced or the resultant water becomes opaque.

To overcome the above disadvantages involved in high muddy water concentration, it has been usual to add clear water to muddy water so as to lower the concentration, after which coagulating agents are added. However, the addition of clear water to the muddy water undesirably increase the amount of the total water to be treated.

SUMMARY OF THE INVENTION

It is an object of the present invention to provide a method for treating muddy water wherein large-sized and hard flocs can be formed by the use of small amounts of chemicals and the resultant water becomes clear and transparent.

The above object can be achieved, according to the present invention, by a method for treating muddy water which comprises adding to muddy water at least one chemical selected from the group consisting of alkali metal oxides, alkaline earth metal oxide, alkali metal hydroxides and alkaline earth metal hydroxides so that the muddy water is rendered alkaline in pH, adding an anionic polymer coagulant to the muddy water simultaneously with or after the addition of the selected compound, adding a sulfate to the muddy water so that muddy water is adjusted to a weakly alkaline level, and then adding an anionic polymer coagulant to the thus adjusted muddy water.

According to the present invention, by the addition of the chemicals in the above order while adjusting the pH as defined above, large-sized and hard flocs can be formed using small amounts of the chemicals, coupled with a further advantage that the resultant water becomes transparent. The reason for this is considered as follows.

In general, fine particles in the muddy water to be treated are combined together and grow into flocs having a fair size. The flocs are potentially stable, under which when coagulants are added to the muddy water, the flocs are combined into only slightly larger-size flocs.

In contrast, according to the present invention, since the pH of the muddy water is adjusted to an alkaline level in pH by addition of an alkali metal oxide, alkaline earth metal oxide, alkali metal hydroxide or alkaline earth metal hydroxide, solid matters combined in the muddy water are deflocculated. By this, the muddy water is converted into a state where flocculation with polymer coagulant is effectively carried out. In fact, the addition of an anionic polymer coagulant at the same time or after the conversion contributes to coagulation of part of the deflocculated fine particles and fulvic acid in the muddy water.

In this condition, muddy matter remains in the muddy water and humic acid is not deflocculated or dissolved therein. Accordingly, a sulfate is added to the muddy water to adjust the pH to a weakly alkaline level, so that humic acid is dissolved and that hydroxide is produced. In this state, an anionic polymer coagulant is added to the resultant muddy water to cause remaining fine particles such as of humic acid, the hydroxide and metal ions to be combined, resulting in larger-sized and harder flocs.

The sulfate useful in the above step includes, for example, aluminium sulfate, ferric sulfate and mixtures thereof.

The anionic polymer coagulants include, for example, sodium alginate, sodium polyacrylate, maleate copolymers, partial hydrolyzates of polyacrylamide and the like. In the practice of the invention, the anionic polymer coagulants may be used singly or in combination.

The pH adjusted by addition of the alkaline chemical is generally a value greater than the pH value of the muddy water by 0.5 and the pH adjusted by addition of a sulfate should be weakly alkaline and is in the range of from 7.0 to 7.3.

DESCRIPTION OF THE PREFERRED EMBODIMENTS

The present invention is described by way of application examples wherein the amounts of the respective chemicals were minimized but optimum amounts which were determined according to a preliminary test from which flocs and separated water were optimumly obtained. Comparative Examples are also described.

EXAMPLE 1A TO 1L

In each of Examples 1A to 1L, predetermined amount of caustic soda was added as chemical 1 to a muddy water produced during excavation of gravel layer by means of a muddy water-type tunnelling machine, so that the pH of the muddy water is adjusted to value indicated in Table 1A. Simultaneously, a partial hydrolyzate of polyacrylamide (anionic polymer coagulant, commercial name of DK Floc DK-10 available from Kurita Kogyo Kabushiki Kaisha) having a molecular weight of about $10^7$ was added to the muddy water as chemical 2, followed by further addition of aluminium sulfate as chemical 3 to the muddy water to adjust the pH to 7.1 to 7.3 and also of an anionic polymer coagulant used as chemical 1 to the muddy water as chemical 4.

In each of Examples 1A to 1L, the concentration (%) of fine particles in the muddy water, the pH of the muddy water after the addition of the chemical 1 and the amounts (%) of the respective chemicals per 100 ml of muddy water are shown in Table 1A.

The chemicals 1, 2, 3 and 4 were added as aqueous solutions with concentrations of 1.0%, 0.2%, 20% and 0.2%, respectively. During the addition of all the chemicals, the muddy water was agitated.

The water content (%) in flocs separated by filtrating the coagulated muddy water, particles of the separated water and the state of flocs (filter cakes) are shown in Table 1A.

As a result, it was found from these Examples that large-sized and hard flocs were formed with transparent separated water.

COMPARATIVE EXAMPLES 1a TO 1c

In each of Comparative Examples 1a to 1c, the muddy water as used in Examples 1A to 1L was treated in the same manner as in Examples 1A to 1L except that the chemicals 1 and 2 used in Examples 1A to 1D were not used.

In each of Comparative Examples 1a to 1c, the concentration (%) of fine particles in the muddy water, the amounts (%) of the respective chemicals per 100 ml of the muddy water, and water content (%) in the separated flocs, turbidity of separated water and the state of flocs (filter cake) are shown in Table 1B. The chemicals 3 and 4 were added as aqueous solutions of 20% and 0.2%, respectively. The pH after addition of the chemical 3 was 7.1 to 7.3.

As a result, it was found that the separated water obtained in each of Comparative Examples 1a and 1b were turbid. In Comparative Example 1c, the anionic polymer coagulant had to be added in an amount larger than in Examples 1A to 1L and Comparative Examples 1a and 1b.

COMPARATIVE EXAMPLES 2a TO 2l

In each of Comparative Examples 2a to 2l, aluminum sulfate was added as chemical 1 to a muddy water (muddy water having a concentration of 35%) as used in Examples 1A to 1L, so that the pH of the muddy water is adjusted to value indicated in Table 2. Immediately, in each of Comparative Examples 2a, 2c, 2e, 2g, 2i and 2k, a partial hydrolyzate of polyacrylamide having a molecular weight of about $10^7$ (anionic polymer coagulant, commercial name DK Floc DK-101 available from Kurita Kogyo Kabushiki Kaisha) was added as chemical 2. Instead of the chemical 2, in each of Comparative Examples 2b, 2d, 2f, 2h, 2j and 2l, a polyacrylamide having a molecular weight of about $10^7$ (a nonionic polymer coagulant, commercial name EDP Floc 151 available from Kurita Kogyo Kabushiki Kaisha) was added as chemical 3.

The chemicals 1, 2 and 3 were, respectively, used as aqueous solutions having concentrations of 20%, 0.2% and 0.25%. During the addition of the respective chemicals, the muddy water were agitated.

In each of Comparative Examples 2a to 2l, the concentration (%) of fine particles in the muddy water, the pH of muddy water after addition of the chemical 1 and the amounts (%) of the respective chemicals per 100 ml of the muddy water are shown in Table 2.

The water content (%) in flocs separated by filtrating the coagulated muddy water, turbidity of the separated water and the state of flocs (filter cakes) are shown in Table 2.

From the above results, it was found that Comparative Examples 2a to 2l requires larger amounts of the anionic polymer coagulant or nonionic polymer coagulant (chemical 2 or 3) than Examples 1A to 1L and Comparative Examples 1a to 1c.

COMPARATIVE EXAMPLES 3a TO 3l

In each of Comparative Examples 3a to 3l, muddy water as used in Comparative Examples 2a to 2l but with a concentration of 26.6% was treated in the same manner as in Comparative Examples 2a to 2l except that caustic soda was used instead of aluminium sulfate as chemical 1. The chemicals 1, 2 and 3 were added as aqueous solutions having concentrations of 1.0%, 0.2% and 0.25%, respectively.

In each of Comparative Examples 3a to 3l, the concentration (%) of fine particles in the muddy water, the pH of the muddy water after the addition of the chemical 1 and the amount (%) of the respective chemicals per 100 ml of muddy water are shown in Table 3.

The water content (%) in flocs separated by filtrating the coagulated muddy water, turbidity of the separated water and the state of the flocs (cakes) are shown in Table 3.

As a result, it was found that in all Comparative Examples 3a to 3l, the anionic or nonionic polymer coagulant (chemical 2 or 3) had to be used in amounts larger than in Examples 1A to 1L and Comparative Examples 1a to 1c. The separated waters were turbid except for Comparative Examples 3a, 3c and 3e. The turbidity of the separated waters in Comparative Examples 3i to 3l was considerable.

COMPARATIVE EXAMPLES 4a TO 4o

In each of Comparative Examples 4a to 4o, aluminium sulfate was added as chemical 1 to the muddy water used in Examples 1a to 1l (muddy water having concentrations of 10, 20 or 30%, so that the pH of the muddy water is adjusted value indicated in Table 4. Immediately, polyacrylamide having a molecular weight of about $10^7$ (nonionic polymer coagulant, commercial name of EDP Floc 151 available from Kurita Kogyo Kabushiki Kaisha) was added as chemical 2.

The chemicals 1 and 2 were, respectively, added as aqueous solutions having concentrations of 20% and 0.25%. During the addition of the respective chemicals, the muddy water were agitated.

In each of Comparative Examples 4a to 4l, the concentration (%) of fine particles in the muddy water, the pH after the addition of chemical 1 and the amounts (%)

of the respective chemicals per 100 ml of the muddy water are shown in Table 4.

The water content (%) of flocs separated by filtrating the coagulated muddy water, turbidity of the separated water and the state of flocs (cakes) are shown in Table 4.

As a result, it was found that in Comparative Examples 4a to 4l, the nonionic polymer coagulant (chemical 2) had to be added in amounts larger than in Examples 1A to 1L and Comparative Examples 1a to 1c. The separated waters were turbid except for Comparative Examples 4j, 4m and 4n. In particular, the separated waters in Comparative Examples 4a and 4k were considerable in turbidity.

COMPARATIVE EXAMPLES 5a TO 5o

In each of Comparative Examples 5a to 5o, the muddy water as used in Comparative Examples 4a to 4o was treated in the same manner as in Comparative Examples 4a to 4o except that there were used caustic soda as chemical 1 instead of aluminum sulfate and a partial hydrolyzate of polyacrylamide having a molecular weight of about $10^7$ (anionic polymer coagulant, commercial name of DK Floc DK101 available from Kurita Kogyo Kabushiki Kaisha) as chemical 2 instead of the nonionic polymer coagulant.

The chemicals 1 and 2 were added as aqueous solutions having concentrations of 1.0% and 0.2%, respectively.

In each of Comparative Examples 5a to 5o, the concentration (%) of fine particles in the muddy water, the pH of the muddy water after the addition of the chemical 1 and the amounts (%) of the respective chemicals per 100 ml of the muddy water are shown in Table 5.

The water content (%) in the flocs separated by filtrating the coagulated muddy water, turbidity of separated water and the state of flocs (cakes) are shown in Table 5.

As a result, it was found that in Comparative Examples 5a, 5b, 5f to 5j and 5m to 5o, the separated waters were all turbid with soft cakes. In Comparative Examples 5c to 5e, only small-sized flocs were formed with bad solid-liquid separability.

TABLE 1A

| | | | (pH of Muddy water = 8.2) | | | | | |
|---|---|---|---|---|---|---|---|---|
| Example | Concentration | pH | Chemical 1 NaOH | Chemical 2 Anion | Chemical 3 Al Sulfate | Chemical 4 Anion | Water Content | Turbidity | State of Cake |
| 1A | 10 | 8.5 | 0.2 | 2 | 0.2 | 3 | 68.5 | transparent | hard |
| 1B | 10 | 9.0 | 0.7 | 2 | 0.4 | 3 | 67.2 | " | " |
| 1C | 10 | 9.5 | 1.0 | 2 | 0.42 | 3 | 71.3 | " | " |
| 1D | 10 | 10.0 | 1.7 | 2 | 0.5 | 3 | 69.8 | " | " |
| 1E | 20 | 8.5 | 0.5 | 2 | 0.2 | 12 | 63.4 | " | " |
| 1F | 20 | 9.0 | 1.1 | 2 | 0.44 | 11 | 62.8 | " | " |
| 1G | 20 | 9.5 | 2.0 | 2 | 0.46 | 11 | 64.6 | " | " |
| 1H | 20 | 10.0 | 2.9 | 2 | 0.56 | 11 | 63.9 | " | " |
| 1I | 30 | 8.5 | 0.8 | 2 | 0.5 | 20 | 59.6 | " | " |
| 1J | 30 | 9.0 | 1.6 | 2 | 0.8 | 20 | 59.8 | " | " |
| 1K | 30 | 9.5 | 2.7 | 2 | 0.9 | 19 | 58.8 | " | " |
| 1L | 30 | 10.0 | 4.3 | 2 | 1.1 | 19 | 59.2 | " | " |

TABLE 1B

| | | | (pH of Muddy water = 8.2) | | | | | |
|---|---|---|---|---|---|---|---|---|
| Comp. Example | Concentration | pH | Chemical 1 NaOH | Chemical 2 Anion | Chemical 3 Al Sulfate | Chemical 4 Anion | Water Content | Turbidity | State of Cake |
| 1a | 10 | 8.2 | — | — | 0.13 | 4 | 72.3 | slightly turbid | slightly soft |
| 1b | 20 | 8.2 | — | — | 0.15 | 12 | 64.5 | slightly turbid | slightly hard |
| 1c | 30 | 8.2 | — | — | 0.3 | 23 | 59.1 | slightly turbid | slightly hard |

TABLE 2

| | | (Mud concentration = 35%, pH = 8.0) | | | | | |
|---|---|---|---|---|---|---|---|
| Comp. Example | pH | Chemical 1 Al sulfate | Chemical 2 Anion | Chemical 3 Nonion | Water Content | Turbidity | State of Cake |
| 2a | 8.0 | — | 43 | — | 55.3 | transparent | hard |
| 2b | 8.0 | — | — | 46 | 55.2 | " | slightly hard |
| 2c | 7.7 | 0.1 | 35 | — | 56.1 | " | hard |
| 2d | 7.7 | 0.1 | — | 55 | 56.0 | " | slightly hard |
| 2e | 7.5 | 0.4 | 38 | — | 57.0 | " | hard |
| 2f | 7.5 | 0.4 | — | 59 | 57.0 | " | slightly hard |
| 2g | 7.0 | 0.6 | 43 | — | 57.6 | " | hard |
| 2h | 7.0 | 0.6 | — | 56 | 56.1 | " | slightly hard |
| 2i | 6.5 | 1.5 | 44 | — | 59.2 | " | slightly hard |
| 2j | 6.5 | 1.5 | — | 58 | 57.0 | " | slightly hard |
| 2k | 6.0 | 2.5 | 56 | — | 60.8 | " | slightly hard |

TABLE 2-continued (Mud concentration = 35%, pH = 8.0)

| Comp. Example | pH | Chemical 1 Al sulfate | Chemical 2 Anion | Chemical 3 Nonion | Water Content | Turbidity | State of Cake |
|---|---|---|---|---|---|---|---|
| 21 | 6.0 | 2.5 | — | 57 | 56.6 | " | slightly hard |

TABLE 3

(Mud concentration = 26.6%, pH = 8.2)

| Comp. Example | pH | Chemical 1 Al sulfate | Chemical 2 Anion | Chemical 3 Nonion | Water Content | Turbidity | State of Cake |
|---|---|---|---|---|---|---|---|
| 3a | 8.2 | — | 22 | — | 58.5 | transparent | hard |
| 3b | 8.2 | — | — | 38 | 62.4 | turbid | granular |
| 3c | 8.4 | 0.4 | 21 | — | 58.5 | transparent | hard |
| 3d | 8.4 | 0.4 | — | 40 | 62.0 | turbid | granular |
| 3e | 8.6 | 0.6 | 19 | — | 60.1 | transparent | hard |
| 3f | 8.6 | 0.6 | — | 38 | 62.2 | turbid | granular |
| 3g | 9.0 | 1.4 | 16 | — | 57.2 | moderately turbid | hard |
| 3h | 9.0 | 1.4 | — | 44 | 62.9 | turbid | granular |
| 3i | 9.5 | 2.5 | 15 | — | 62.9 | strongly turbid | hard |
| 3j | 9.5 | 2.5 | — | 44 | 63.0 | strongly turbid | granular |
| 3k | 10.0 | 4.5 | 14 | — | 57.9 | strongly turbid | hard |
| 3l | 10.0 | 4.5 | — | 52 | 64.4 | strongly turbid | granular |

TABLE 4

(pH of Muddy water = 8.2)

| Comp. Example | Concentration | pH | Chemical 1 Sulfate | Chemical 2 Nonion | Water Content | Turbidity | State of Cake |
|---|---|---|---|---|---|---|---|
| 4a | 10 | 8.2 | — | 8 | 67.8 | strongly turbid | granular |
| 4b | 10 | 7.7 | 0.07 | 9 | 70.8 | moderately turbid | " |
| 4c | 10 | 7.5 | 0.16 | 9 | 70.6 | slightly turbid | " |
| 4d | 10 | 7.0 | 0.5 | 10 | 71.5 | slightly turbid | " |
| 4e | 10 | 6.5 | 0.8 | 10 | 72.0 | slightly turbid | " |
| 4f | 20 | 8.2 | — | 33 | 61.7 | moderately turbid | " |
| 4g | 20 | 7.7 | 0.07 | 28 | 62.0 | moderately turbid | " |
| 4h | 20 | 7.5 | 0.18 | 26 | 61.6 | moderately turbid | " |
| 4i | 20 | 7.0 | 0.6 | 26 | 60.7 | moderately turbid | " |
| 4j | 20 | 6.5 | 0.9 | 25 | 61.8 | transparent | slightly soft |
| 4k | 30 | 8.2 | — | 36 | 60.4 | strongly turbid | granular |
| 4l | 30 | 7.7 | 0.1 | 35 | 59.3 | moderately turbid | " |
| 4m | 30 | 7.5 | 0.2 | 35 | 59.0 | transparent | slightly soft |
| 4n | 30 | 7.0 | 0.6 | 38 | 60.3 | " | slightly soft |
| 4o | 30 | 6.5 | 0.8 | 39 | 60.9 | slightly turbid | slightly soft |

TABLE 5

(pH of Muddy water = 8.2)

| Comp. Example | Concentration | pH | Chemical 1 Sulfate | Chemical 2 Nonion | Water Content | Turbidity | State of Cake |
|---|---|---|---|---|---|---|---|
| 5a | 10 | 8.2 | — | 6 | 69.9 | weakly turbid | slightly soft |
| 5b | 10 | 8.5 | 0.2 | 6 | 68.0 | weakly turbid | slightly soft |
| 5c | 10 | 9.0 | 0.7 | 5-15 | — | — | — |
| 5d | 10 | 9.5 | 1.0 | 5-15 | — | — | — |

TABLE 5-continued
(pH of Muddy water = 8.2)

| Comp. Example | Concentration | pH | Chemical 1 Sulfate | Chemical 2 Nonion | Water Content | Turbidity | State of Cake |
|---|---|---|---|---|---|---|---|
| 5e | 10 | 10.0 | 1.7 | 5-15 | — | — | — |
| 5f | 20 | 8.2 | — | 12 | 62.0 | weakly turbid | slightly soft |
| 5g | 20 | 8.5 | 0.5 | 11 | 60.7 | weakly turbid | slightly soft |
| 5h | 20 | 9.0 | 1.1 | 10 | 61.9 | weakly turbid | slightly soft |
| 5i | 20 | 9.5 | 2.0 | 8 | 64.1 | weakly turbid | slightly soft |
| 5j | 20 | 10.0 | 2.9 | 7 | 62.0 | weakly turbid | slightly soft |
| 5k | 30 | 8.2 | — | 18 | 59.0 | transparent | hard |
| 5l | 30 | 8.5 | 0.8 | 15 | " | " | " |
| 5m | 30 | 9.0 | 1.6 | 12 | 61.0 | weakly turbid | " |
| 5n | 30 | 9.5 | 2.7 | 11 | 58.0 | weakly turbid | " |
| 5o | 30 | 10.0 | 4.3 | 7 | " | weakly turbid | " |

What is claimed is:

1. A method for treating muddy water containing fine particles which comprises first adding a first chemical selected from the group consisting of alkali metal oxides, alkaline earth metal oxides, alkali metal hydroxides and alkaline earth hydroxides to a muddy water to be treated in an amount sufficient to render the pH of said muddy water alkaline and to defloculate said fine particles in said muddy water, and adding a second chemical containing an anionic polymer coagulant to said muddy water in an amount sufficient to coagulate at least some of said fine particles in said muddy water, further adding a third chemical, containing a sulfate selected from a group consisting of aluminum sulfate, ferric sulfate and mixtures thereof, to said muddy water in an amount sufficient to render said muddy water weakly alkaline in the pH range of from about 7.0 to about 7.3 and then adding a fourth chemical containing an anionic polymer coagulant to said muddy water in an amount sufficient to form a floc including said fine particles, separating said floc from said muddy water to remove turbidity from said muddy water, and forming transparent separated water.

2. A method according to claim 1, wherein the anionic polymer coagulant used in the second and fourth chemicals is a member selected from the group consisting of sodium alginate, sodium polyacrylate, maleate copolymers, a partial hydrolyzate of polyacrylamide and mixtures thereof.

3. A method according to claim 1, wherein the first and second chemicals are added to said muddy water simultaneously.

4. A method according to claim 1, wherein after the addition of the first chemical to the muddy water, the second chemical is added to said muddy water.

5. A method according to claim 1, wherein said first chemical is caustic soda.

* * * * *